(12) United States Patent
Karapantelakis et al.

(10) Patent No.: US 12,737,638 B2
(45) Date of Patent: Sep. 15, 2026

(54) TRANSFER LEARNING OF MACHINE LEARNING MODEL IN DISTRIBUTED NETWORK

(71) Applicant: Telefonaktiebolaget LM Ericsson (publ), Stockholm (SE)

(72) Inventors: Athanasios Karapantelakis, Solna (SE); Lackis Eleftheriadis, Valbo (SE); Alexandros Nikou, Stockholm (SE); Pedro Batista, Sollentuna (SE); Ioannis Fikouras, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 851 days.

(21) Appl. No.: 17/926,744

(22) PCT Filed: May 25, 2020

(86) PCT No.: PCT/EP2020/064381

§ 371 (c)(1),
(2) Date: Nov. 21, 2022

(87) PCT Pub. No.: WO2021/239201

PCT Pub. Date: Dec. 2, 2021

(65) Prior Publication Data

US 2023/0206095 A1 Jun. 29, 2023

(51) Int. Cl.
*G06N 3/096* (2023.01)
*G06N 3/098* (2023.01)

(52) U.S. Cl.
CPC ............ *G06N 3/096* (2023.01); *G06N 3/098* (2023.01)

(58) Field of Classification Search
CPC ..................................................... G06N 3/096
See application file for complete search history.

(56) References Cited

U.S. PATENT DOCUMENTS

2016/0205204 A1* 7/2016 Fersman .............. G06F 9/5072 709/226
2020/0404480 A1* 12/2020 Zhu ...................... H04W 48/12

OTHER PUBLICATIONS

Daga, Harshit, et al. "Cartel: A system for collaborative transfer learning at the edge." Proceedings of the ACM Symposium on Cloud Computing. 2019. (Year: 2019).*
International Search Report and Written Opinion of the International Searching Authority for PCT International Application No. PCT/EP2020/064381 dated Mar. 19, 2021.

(Continued)

*Primary Examiner* — Eric Nilsson
(74) *Attorney, Agent, or Firm* — Sage Patent Group

(57) ABSTRACT

A method performed by a first node in a distributed network is provided. The method includes receiving a request from a second node for transfer learning of a machine learning model for a use case. The request includes a description of a local environment and a use case identifier at the second node. The method further includes identifying a matching criteria for the local environment of the second node based on the use case. The method further includes determining whether at least one distributed node from a plurality of distributed nodes in the distributed network satisfies at least one of a match or a closest match to the matching criteria.

18 Claims, 8 Drawing Sheets

(56) References Cited

OTHER PUBLICATIONS

Francesco Davide Calabrese et al, "Learning Radio Resource Management in RANs: Framework, Opportunities, and Challenges", IEEE Communications Magazine., vol. 56, No. 9, Sep. 1, 2018 (Sep. 1, 2018), p. 138-145.
Li Jingmei et al, "Multi-Source Deep Transfer Neural Network Algorithm", Sensors (Basel), Sep. 16, 2019 (Sep. 16, 2019), vol. 19, No. 18, p. 3992, 16 pages.
Yi Yao et al, "Boosting for transfer learning with multiple sources", 2010 IEEE Conference on Computer Vision and Pattern Recognition (CVPR), Jun. 13-18, 2010, San Francisco, CA, USA, IEEE, Piscataway, NJ, USA, Jun. 13, 2010 (Jun. 13, 2010), p. 1855-1862.
Adrian Nilsson et al, "Evaluating the Performance of Federated Learning—A Case Study of Distributed Machine Learning with Erlang", Master's Thesis, Chalmers University of Technology and University of Gothenburg, Sweden 2018, 75 pages.
CellID Finder, "Find GSM base stations cell id coordinates", https://cellidfinder.com, May 20, 2020, 2 pages.
Opencellid, "The world's largest Open Database of Cell Towers", Largest Open Database of Cell Towers & Geolocation—by Unwired Labs, https://opencellid.org/#zoom=16&lat=37.77889&Ion=-122.41942, May 20, 2020, 2 pages.

* cited by examiner

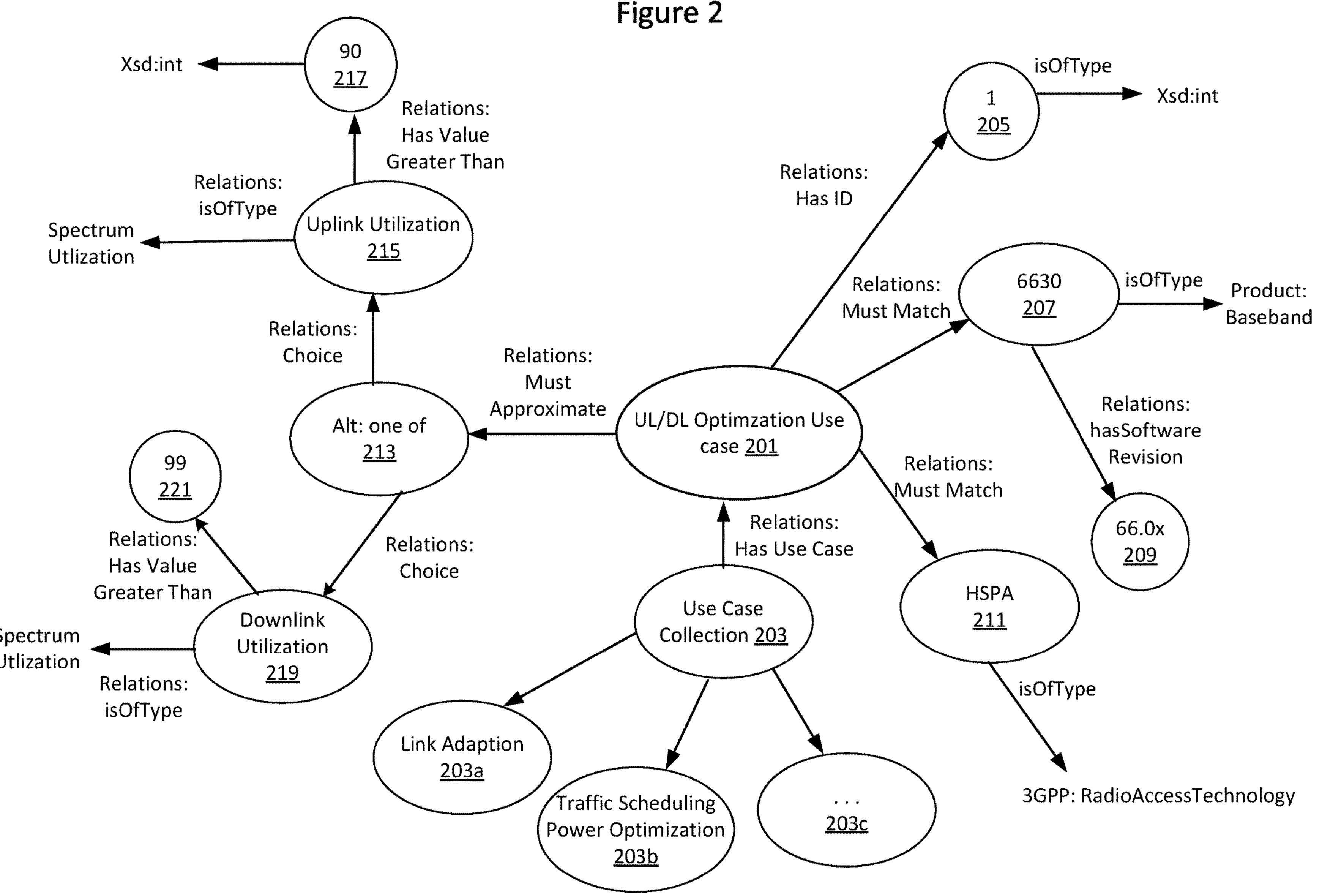
Figure 2
UL/DL Optimzation Use case 201
Relations: Has ID
1 205
isOfType
Xsd:int
Relations: Must Match
6630 207
isOfType
Product: Baseband
Relations: hasSoftware Revision
66.0x 209
Relations: Must Match
HSPA 211
isOfType
3GPP: RadioAccessTechnology
Relations: Has Use Case
Use Case Collection 203
Link Adaption 203a
Traffic Scheduling Power Optimization 203b
. . . 203c
Relations: Must Approximate
Alt: one of 213
Relations: Choice
Uplink Utilization 215
Relations: Has Value Greater Than
90 217
Xsd:int
Relations: isOfType
Spectrum Utlization
Relations: Choice
Downlink Utilization 219
Relations: Has Value Greater Than
99 221
Relations: isOfType
Spectrum Utlization Knowledge Base 103
Specialized Agent 102b
Specialized Agent 102a
Composing Agent 101
Requesting Agent 104
301
303
305
307
309
311
313
315
317
Alt Cluster plurality of distributed nodes based on a first criteria of the matching criteria, wherein the clustering includes identifying the plurality of distributed nodes in the distributed network that satisfy the match to the first criteria of the matching criteria 901

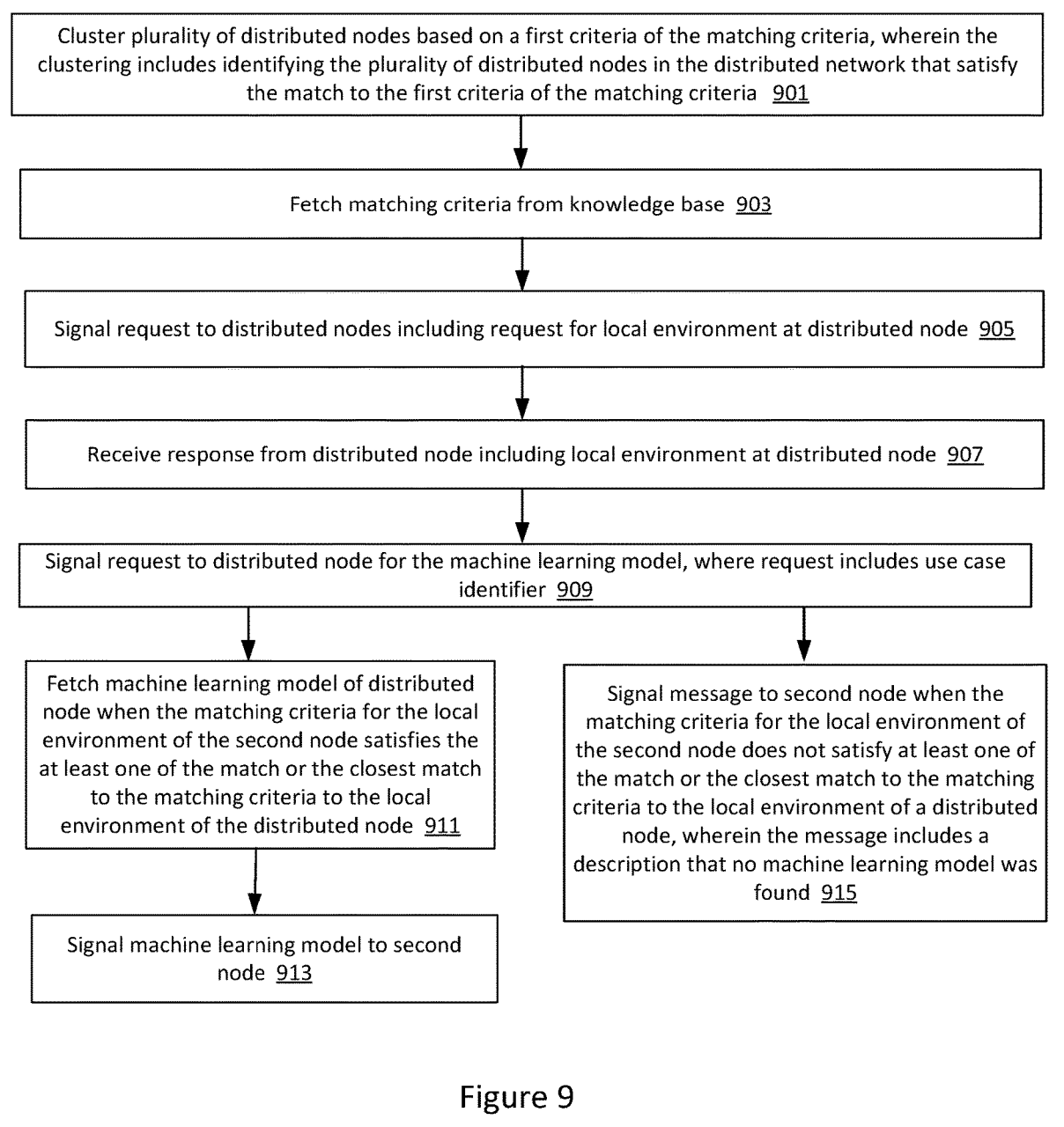

Fetch matching criteria from knowledge base 903

Signal request to distributed nodes including request for local environment at distributed node 905

Receive response from distributed node including local environment at distributed node 907

Signal request to distributed node for the machine learning model, where request includes use case identifier 909

Fetch machine learning model of distributed node when the matching criteria for the local environment of the second node satisfies the at least one of the match or the closest match to the matching criteria to the local environment of the distributed node 911

Signal machine learning model to second node 913

Signal message to second node when the matching criteria for the local environment of the second node does not satisfy at least one of the match or the closest match to the matching criteria to the local environment of a distributed node, wherein the message includes a description that no machine learning model was found 915

Figure 9

Receive request for matching criteria for use case from first node 1101

Signal matching criteria for use case to first node 1103

TRANSFER LEARNING OF MACHINE LEARNING MODEL IN DISTRIBUTED NETWORK

CROSS REFERENCE TO RELATED APPLICATION

This application is a 35 U.S.C. § 371 national stage application of PCT International Application No. PCT/EP2020/064381 filed on May 25, 2020, the disclosure and content of which is incorporated by reference herein in its entirety.

TECHNICAL FIELD

The present disclosure relates generally to transfer learning of a machine learning model, and more particularly to a method, a first node, a distributed node, a node, computer programs and computer program products in a distributed network for transfer learning of a machine learning model for a use case.

BACKGROUND

In machine learning, transfer learning is the process of transferring knowledge gained via training of one model to another—an assumption being that the task of both models is related. Transfer learning may be popular for Convolutional Neural Networks (CNNs)-based models and may especially be used for a "feature extraction" process for identifying what "features" out of input data are important. In general, transfer learning assumes a source model trained on a source dataset for a specific task. The learned knowledge (also known as features), is then transferred to a second network to be trained on a target dataset for a task. The process may work as long as the features are generally suitable to both base and target tasks. There remains a need for identifying a suitable source model to be transferred.

SUMMARY

According to some embodiments, a computer-implemented method performed by a first node in a distributed network for transfer learning of a machine learning model for a use case is provided. The method includes receiving a request from a second node for transfer learning of a machine learning model for a use case. The request includes a description of a local environment and a use case identifier at the second node. The method further includes identifying a matching criteria for the local environment of the second node based on the use case. The method further includes determining whether at least one distributed node from a plurality of distributed nodes in the distributed network satisfies at least one of a match or a closest match to the matching criteria.

According to other embodiments, a computer-implemented method performed by a distributed node in a distributed network for transfer learning of a machine learning model for a use case is provided. The method includes receiving a request from a first node in the distributed network, wherein the request comprises a request for the local environment at the distributed node. The method further includes, responsive to the request, signaling a response to the first node comprising the local environment at the distributed node.

In other embodiments, a computer-implemented method performed by a node comprising a knowledge base in a distributed network for transfer learning of a machine learning model for a use case is provided. The method includes receiving a request for a matching criteria for the use case from a first node in the distributed network. The method further includes signaling the matching criteria for the use case to the first node.

According to some embodiments, a first node configured to operate in a distributed network is provided. The first node includes processing circuitry; and memory coupled with the processing circuitry. The memory includes instructions that when executed by the processing circuitry causes the first node to perform operations including receiving a request from a second node for transfer learning of a machine learning model for a use case. The request includes a description of a local environment and a use case identifier at the second node. The operations further include identifying a matching criteria for the local environment of the second node based on the use case. The operations further include determining whether at least one distributed node from a plurality of distributed nodes in the distributed network satisfies at least one of a match or a closest match to the matching criteria.

In other embodiments, a computer program including program code to be executed by processing circuitry of a first node configured to operate in a distributed network is provided, whereby execution of the program code causes the first node to perform operations. The operations include receiving a request from a second node for transfer learning of a machine learning model for a use case, wherein the request comprises a description of a local environment and a use case identifier at the second node. The operations further include identifying a matching criteria for the local environment of the second node based on the use case. The operations further include determining whether at least one distributed node from a plurality of distributed nodes in the distributed network satisfies at least one of a match or a closest match to the matching criteria.

In other embodiments, a computer program product including a non-transitory storage medium including program code to be executed by processing circuitry of a first node configured to operate in a distributed network is provided, whereby execution of the program code causes the first node to perform operations. The operations including receiving a request from a second node for transfer learning of a machine learning model for a use case. The request includes a description of a local environment and a use case identifier at the second node. The operations further include identifying a matching criteria for the local environment of the second node based on the use case. The operations further include determining whether at least one distributed node from a plurality of distributed nodes in the distributed network satisfies at least one of a match or a closest match to the matching criteria.

According to some embodiments, a distributed node operating in a distributed network is provided. The distributed node includes processing circuitry; and memory coupled to the processing circuitry and having instruction stored therein that are executable by the processing circuitry to cause the distributed node to perform operations. The operations include receiving a request from a first node in the distributed network. The request includes a request for the local environment at the distributed node. The operations further include, responsive to the request, signaling a response to the first node including the local environment at the distributed node.

According to other embodiments, a computer program including program code to be executed by processing circuitry of a distributed node configured to operate in a distributed network is provided, whereby execution of the program code causes the distributed node to perform operations. The operations include receiving a request from a first node in the distributed network. The request includes a request for the local environment at the distributed node. The operations further include, responsive to the request, signaling a response to the first node comprising the local environment at the distributed node.

According to other embodiments, a computer program product including a non-transitory storage medium including program code to be executed by processing circuitry of a distributed node configured to operate in a distributed network is provided, whereby execution of the program code causes the distributed node to perform operations. The operations include receiving a request from a first node in the distributed network. The request includes a request for the local environment at the distributed node. The operations further include, responsive to the request, signaling a response to the first node comprising the local environment at the distributed node.

According to some embodiments, a node including a knowledge base in a distributed network for transfer learning of a machine learning model for a use case is provided. The node includes processing circuitry; and memory coupled to the processing circuitry and having instruction stored therein that are executable by the processing circuitry to cause the node to perform operations. The operations include receiving a request for a matching criteria for the use case from a first node in the distributed network. The operations further include signaling the matching criteria for the use case to the first node.

According to other embodiments, a computer program including program code to be executed by processing circuitry of a node configured to operate in a distributed network is provided, whereby execution of the program code causes the node to perform operations. The operations include receiving a request for a matching criteria for the use case from a first node in the distributed network. The operations further include signaling the matching criteria for the use case to the first node.

According to other embodiments, a computer program product including a non-transitory storage medium including program code to be executed by processing circuitry of a node configured to operate in a distributed network is provided, whereby execution of the program code causes the node to perform operations. The operations include receiving a request for a matching criteria for the use case from a first node in the distributed network. The operations further include signaling the matching criteria for the use case to the first node.

Potential advantages provided by various embodiments of the present disclosure may include that, by including transfer learning of a machine learning model for a use case based on a local environment, the machine learning model may be lightweight, adapted to the local environment (and as a consequence may increase accuracy), and training may be eliminated or reduced.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 2 is a graph illustrating an example of matching criteria in a knowledge base for a use case in accordance with some embodiments;

FIG. 9 is a flow chart illustrating examples of further operations performed by a first node in accordance with some embodiments;

DETAILED DESCRIPTION

Figure 1:
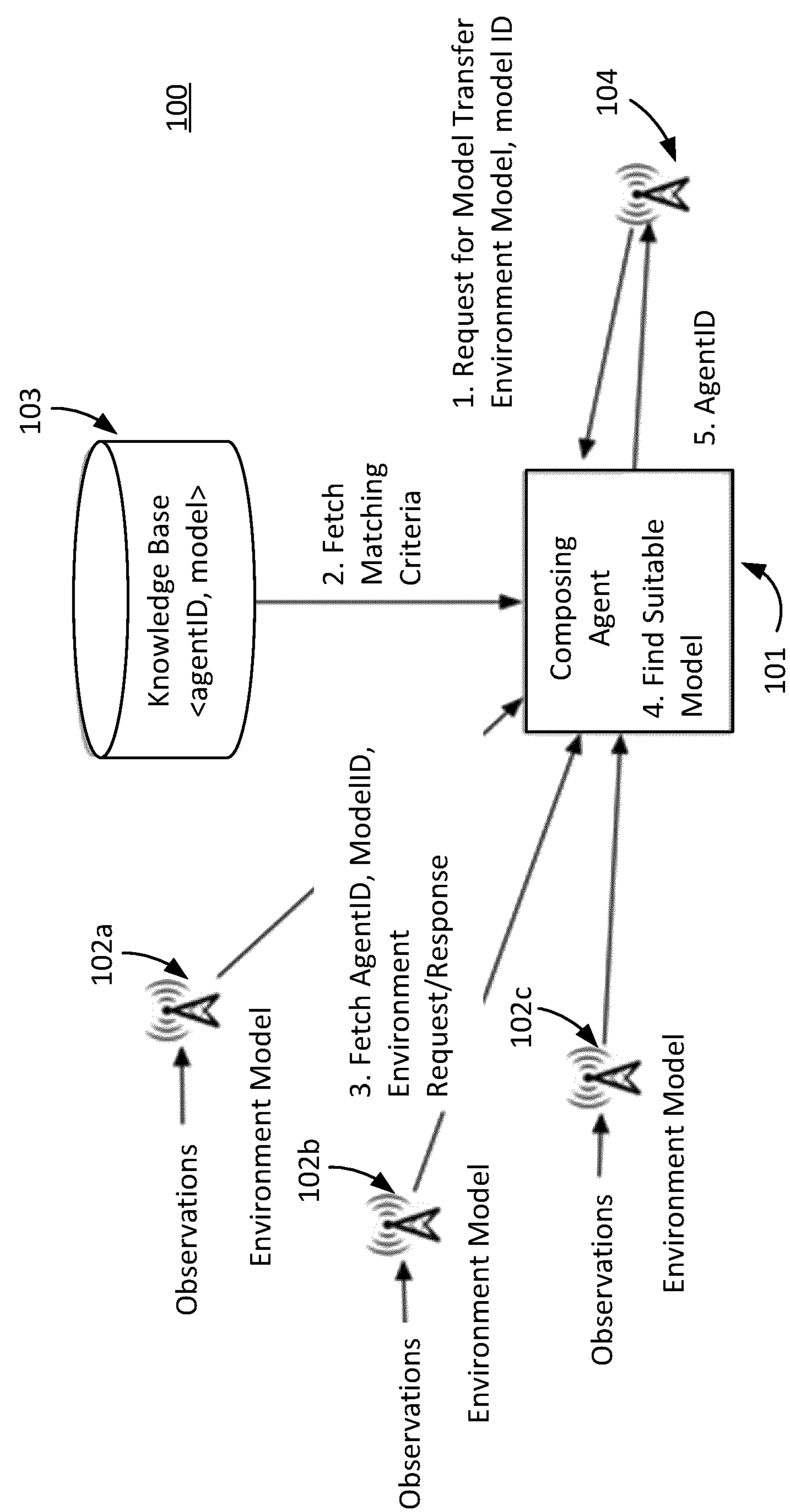
FIG. 1 is a bock diagram illustrating an example of a distributed network including an agent identity (AgentID) and a model identity (ModelID) for transfer learning in accordance with various embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Some approaches may exist for choosing what features to transfer in transfer learning, and whether the features to transfer should be transferred as is (e.g. as "frozen" layers in a convolutional neural network model for example) or adapted to match the domain of the new task.

Looking at transfer learning from a topological perspective, some approaches in machine learning theoretical research, and advances in software and hardware capacity, may consider machine learning at the network edge. In some approaches, the process of learning (i.e. training of models) at the network edge is done at remote areas of the network and in a distributed fashion, rather than at a central network node. In such distributed environments, transfer learning may play an important role as knowledge is reused across learning agents (also referred to herein as machine learning models and/or models).

Although some approaches may take into account the volume of data used to train the model to be transferred in relation to the data available on the location of transfer, such approaches may not take into account the environment the model to be transferred was trained in. As used herein, an environment (including, but not limited to, a local environment) refers to a set of features that affect a bias of the model. For example, assume a model is provided for identifying overheating events in a radio base station cabinet. The model examines several parameters that include temperature sensors from boards, ambient temperature, and humidity. In this example, the model could perform well in north European countries, but when used in a country with tropical climate (e.g. Thailand or Indonesia), it may underperform, as different combinations of extreme humidity and temperature may lead to equipment being critical earlier than expected-data which is unavailable in central Europe.

Various embodiments of the present disclosure may provide solutions to these and other potential problems. Various embodiments described herein propose transfer learning when the domain is the same. For example, assuming a neural network that classifies when a radio base station is "critical", "potentially critical" and "nominal", using as an input a list of alarms. In some embodiments, a system and/or method is provided such that what is learned in one radio base station can be transferred to another radio base station. The radio base station transferring its learning can learn using a combination of knowledge obtained a priori as well as its own knowledge.

In various embodiments described herein, transfer learning is based on a characterization of a local environment of the local node doing the training as well as the local environment of the node receiving the results of this training. If the local environments sufficiently match, the transfer learning may be more successful. In various embodiments described herein, a central node takes a broker role and not an aggregator role. Thus, the local environment essentially describes the bias of the model. It is noted that the local environment is not limited to features that are immediate inputs to the trained model, but also may include features that may indirectly affect the model bias. For example, referring again to above example of a model for identifying overheating events in a radio base station cabinet, features such as the availability of power from the power grid could be part of the local environment, affecting the bias of the model, while at the same time not being input to the model.

The system and/or methods described herein may be well suited for network topologies, and especially 3GPP networks, where training happens at the network edge, e.g., in every radio site, and the local environment of the radio site is very dynamic and diverse. For example, in some embodiments, the model relates to the configuration of a radio base station to either optimize or fix a fault in the operations of a radio base station by means of altering the configuration of the radio base station.

For a 3GPP network and a model domain at the network edge as described above, operational advantages of the present disclosure may include:

- Models may be more lightweight and adapted to the local conditions/environment when compared to a centralized model.
- Models may be more accurate than other distributed learning solutions (e.g. federated learning).
- The time and data to train a model may be smaller than training a model from scratch. In some cases, the models may be used "as-is" without requirement for training. This may be quite useful for commissioning of new radio base stations, as well as for existing radio base stations where a local environment changes. In both cases, a central brokering node may find a suitable model from other radio base stations.

While embodiments described herein are explained in the non-limiting context of a 3GPP network, the invention is not so limited. Instead, other distributed networks may be used, including without limitation, a hierarchical topology such a layer-3 switches (routers), etc.

FIG. 1 is a bock diagram illustrating an example of a distributed network 100 including an AgentID and a ModelID for transfer learning in accordance with various embodiments. Distributed network 100 includes three types of entities:

- A set of "specialized agents", one at each distributed radio base station 102 (e.g., 102*a*, 102*b*, 102*c*, etc, and also referred to herein as a distributed node), which, based on observations, generate a characterization of the local environment at the respective radio base station. The specialized agents include some type of machine learning capacity for training and executing models.
- A "composing agent" at a first node 101 acts as a broker. When triggered by a new request for transfer learning from a second node (e.g., second node 104), first node 101 queries the "specialized agents" of each distributed node 102 with regard to what model they have trained in what local environment. Subsequently, if model and local environment match the requirements of the request, first node 101 offers the model to the requestor (e.g., second node 104).
- A "knowledge base" at node 103 includes rules on which the matching referenced above will be carried out by the composing agent at first node 101.

As discussed further herein, in the non-limiting embodiment of FIG. 1, node 104 signals a request to node 101 for transfer learning of a machine learning model for a use case. The request includes a description of a local environment and a use case identifier (e.g., a ModelID or a UseCaseID) at node 104. Node 101 fetches a matching criteria from knowledge base 103 for the local environment of node 104 based on the use case. Node 101 also fetches identifying information for a machine learning model (e.g., AgentID) and a use case (e.g., ModelID or UseCaseID) from at least one distributed node from a plurality of distributed nodes (e.g., nodes 102*a*, 102*b*, 102*c*, etc.) to determine whether a distributed node satisfies at least one of a match or a closet match to the matching criteria.

While embodiments described herein are explained in the non-limiting context of each of the composing agent, specialized agent(s), and the knowledge base being separate and discrete entities, the invention is not so limited. In practice, the composing agent may be co-located with a specialized agent in the same physical node. The knowledge base also may be co-located with a specialized agent in the same physical node. Additionally, the specialized agent and composing agent each are logical entities, which in embodiments describing a 3GPP non-limiting implementation can be part of a baseband unit and the core network respectively (e.g. network data analytics function (NWDAF) node).

Local environments will now be described.

As referred to herein, a local environment of a cell of a node in a 3GPP distributed network refers to a representation of a communication device (e.g., a User Equipment (UE)) behavior and power network behavior, weather, backhaul/transport network as well as models and software package of the radio base station equipment. An exemplary formalization of a local environment for a cell, $Env_{cellx}$, is presented below:

$$Env_{cell_x} = \text{list}\begin{bmatrix} UE\ \text{list}\left(\begin{bmatrix}\text{ID}, PowerClass[1\ldots\ 5], \text{State[IDLE, ACTIVE, INACTIVE], Vendor,} \\ \text{Throughput Model, Mobility}\end{bmatrix}\right) \\ PowerGrid\ DCIN[\text{Voltage, frequency}], PowerSource[\text{Solar, Wind, Battery}, DG] \\ \text{Location [latitude, longitutde]} \\ SpectrumUtilization[\%\ \text{of}\ UL-DL] \\ InterferenceLevel[dBm] \\ \text{Backhaul Transport}[type[mmWave, \text{fiber}], \text{capacity}] \\ \text{Frequency Band} \\ EquipmentList[modelType, CV] \\ \text{RAT}[LTE, LTEadv, 3G, 5G, \ldots] \end{bmatrix}$$

The exemplary formalization represents a set of quantifiable parameters as a set of features (e.g., a vector of features). The parameters include, without limitation:

- UE-related parameters of UEs: a unique identity of the UE (for example, its International Mobile Subscriber Identity number, its Radio Resource Control State (if it is idle, active or inactive), the vendor and model of the UE (both of which can be obtained via the International Mobile Equipment Identity (IMEI)), the UE's mobility (which in a simple case can be a list of <cellID, time of attach, time of detach>triplets, which is essentially a list of cells the UE visited over time, and how long it remained attached to them. This information can be obtained e.g. via a mobility node such as a mobility management entity (MME) in 4G, and an access and mobility management function (AMF) in 5G). Additionally, throughput can be obtained by the baseband (e.g., eNB counters).
- The status of the power grid in terms of the input voltage and frequency, but also current distribution of power (e.g. Solar, Wind and Battery)
- Location of the cell the UE is currently attached to (this information can be obtained by querying a cellID database, either internal to the operator or external such as https://cellidfinder.com or http://opencellid.org
- A spectrum utilization rating (which can be obtained from the baseband node), e.g., what percentage of bandwidth is utilized on uplink and downlink.
- A level of interference that can either be the average level of interference reported by UEs attached to the cell periodically via RRC measurement reports, or measured by the cell itself.
- A characterization of the backhaul connection. For example, in terms of type of physical interface (e.g. fiber or microwave), capacity, and load level (e.g., throughput as fraction of capacity)
- The frequency band in which the cell operates. This could be also be a list of frequency bands.
- The Radio Access Technology used (e.g. LTE, 5G, etc.).
- A list of equipment used in the cabinet. An equipment model type can include the type of equipment (e.g. baseband, power supply, battery as well as the model number, e.g. 6630) and CV (the current software revision the equipment is running (where applicable).

As FIG. 1 illustrates, the local environment description of a distributed node can be obtained from the composing agent on request, upon triggering of a transfer learning process described further herein.

Triggering transfer learning will now be discussed.

Various embodiments of the present disclosure operate on a use-case basis. For example, each use case is related to a subset of relevant features that describe the local environment at the requesting node (e.g., node 104) and a distributed node(s) 102. For example, a subset of features describing a relevant environment for a use case can include, without limitation:

- In a first embodiment, a use case on transfer learning of a machine learning model of downlink/uplink ratio optimization can be affected by the following local environmental features: spectrum utilization, interference level, frequency band, RAT. At the same time, features such as Power Grid and Backhaul Transport may be less relevant and could be omitted.
- In another embodiment, a use case on transfer learning for energy efficient traffic scheduling can include information on UE state, throughput, radio power input, and power input level in volts from power grid. At the same time, features such as backhaul transport, location, spectrum utilization and interference level may not be taken into account.
- In yet another embodiment, a use case on transfer learning link adaptation can be affected by Vendor, Mobility, Interference and Frequency Band. Other features, e.g., Backhaul Transport, can be omitted.

Fetching matching criteria will now be described.

In some embodiments, matching criteria are stored in a knowledge base, as discussed above with reference to FIG. 1. The matching criteria is stored on a per use-case basis. FIG. 2 is a graph illustrating an example of matching criteria stored in a knowledge base for a use case in accordance with some embodiments. While the embodiment illustrated in FIG. 2 uses a graph-based representation, the invention is not so limited. Instead, other representations may be used, including without limitation, a relational database.

FIG. 2 illustrates matching criteria for an uplink/downlink (UL/DL) optimization use case 201 having a use case identifier (id) 1 (circle 205). In the embodiment illustrated in FIG. 2, the matching criteria is divided in two categories: a first criteria and a second criteria. Still referring to FIG. 2, a first criteria that must match to a certain value, although the value may be in a range. In FIG. 2 for example, the model must be baseband 6630 (oval 207) running software revision 66.0.x (circle 209), where x could be any value, e.g. 66.0.1, 66.0.2, etc. Additionally, the network must be of high speed packet access (HSPA) radio access technology (oval 211).

Still referring to FIG. 2, the second criteria is an approximation. In the example of FIG. 2, the approximation is related to whether utilization of UL/DL bandwidth is close to a threshold. For the approximation, either uplink utilization (oval 215) has a value greater than 90 (circle 217) or downlink utilization (oval 219) has a value greater than 99 (circle 221).

While embodiments described herein are explained in the non-limiting context of the first and second criteria of the matching criteria of FIG. 2, the invention is not so limited. Instead, one or more criteria may be used, including without limitation, only the first criteria, only the second criteria, only a third criteria, etc, or any combination thereof. It will be understood that although the terms first, second, third, etc. may be used herein to describe various elements/operations, these elements/operations should not be limited by these terms. These terms are only used to distinguish one element/operation from another element/operation. Thus, a first criteria in some embodiments could be termed a second criteria in other embodiments without departing from the teachings of present inventive concepts.

In some embodiments, when the composing agent (e.g., 509) of a first node (e.g., node 101) tries to find a good fit, it first clusters the distributed nodes (e.g., nodes 102) using a first criteria of a matching criteria of the knowledge base (e.g., 703 of node 103) to find a match to the first criteria. The first criteria includes at least one value of a local environment of the requesting node (e.g., node 104) for use in finding a match to the least one value in a local environment of a distributed node (e.g., node 102*a*, 102*b*, 102*c*). In some embodiments, the first criteria includes a rule for identifying a match between (1) at least one parameter from a first set of parameters for the local environment of the requesting node, and (2) the at least one parameter in a second set of parameters for the local environment of each distributed node in the plurality of distributed nodes. The composing agent of the first node (e.g., node 101) clusters the distributed nodes in the distributed network by identifying the distributed nodes that each satisfy a match to the first criteria. Subsequently, or alternatively, the composing agent (e.g., node 101) uses a second criteria of a matching criteria of the knowledge base) to find a closest match to the second criteria. The second criteria includes at least one parameter from a first set of parameters as a first set of features that describe the local environment of the requesting node (e.g., node 104) for use in finding a closest match to the at least one parameter in a second set of parameters as a second set of features that describe a local environment of a distributed node (e.g., by constructing sub-sets (e.g., sub-vectors) of the features that are grouped under "approximate match" and then using cosine similarity).

Figure 3:
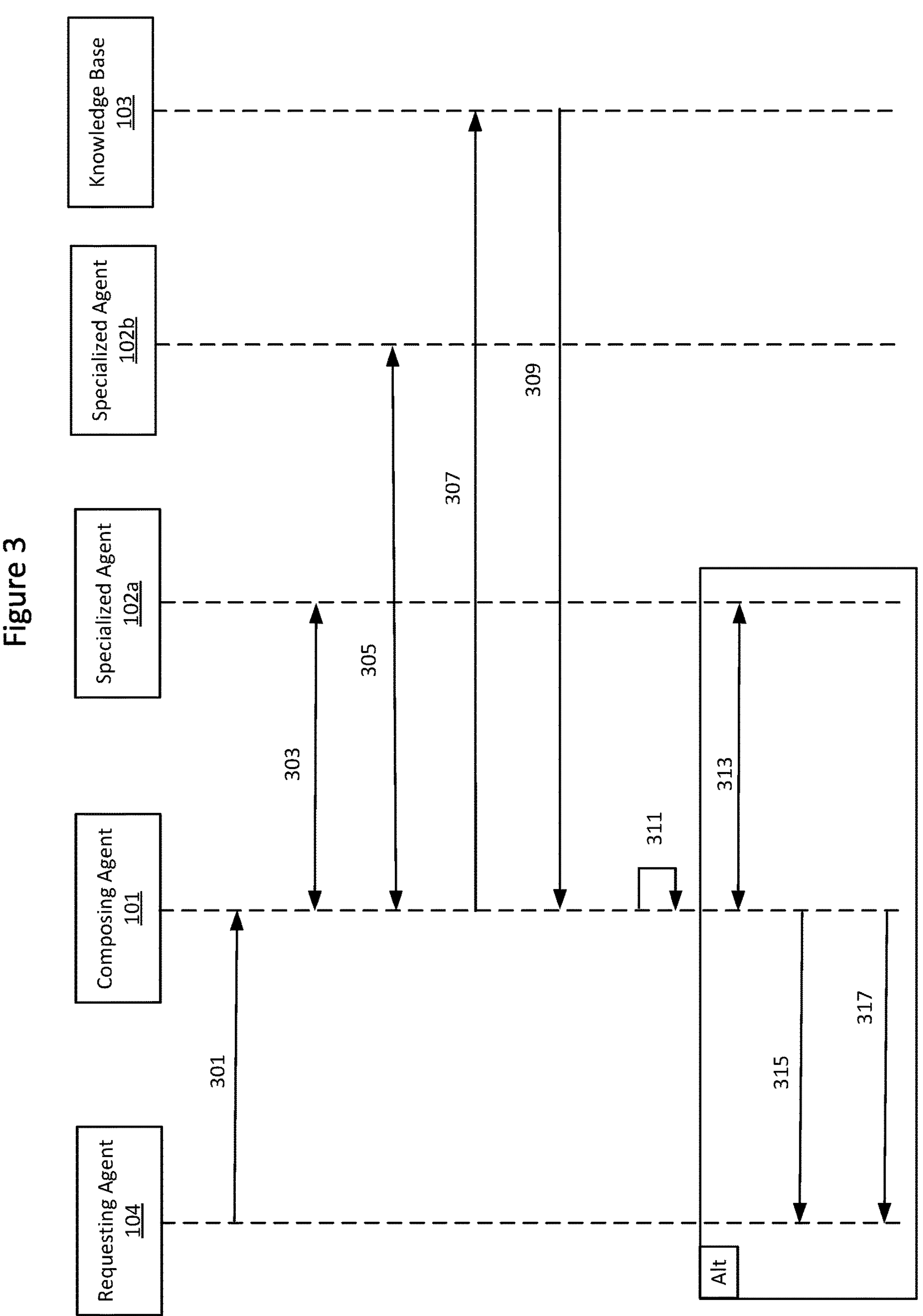
FIG. 3 is a sequence diagram illustrating an example of operations in a distributed network in accordance with some embodiments.

FIG. 3 is a sequence diagram illustrating an example of operations in a distributed network in accordance with some embodiments.

Referring to FIG. 3, in one embodiment, at operation 301, requesting agent of second node 104 signals a request towards composing agent 509 of first node 101 for a machine learning model for a use case. The request includes a description of a local environment at second node 104 (e.g., $Env_{cellx}$ described above) and a use case identifier correlated to a use case (e.g., 205 in FIG. 2).

Composing agent 509 of first node 101 receives the request for a machine learning model for the use case. Responsive to the request, at operations 303 and 305, first node 101 signals a request to specialized agent 609 at each of distributed nodes 102*a* and 102*b*, respectively, to fetch a description of the local environment of a cell at each of distributed nodes 102*a* and 102*b*. Responsive to the requests, first node 101 fetches the description of the local environment of a cell at each of distributed nodes 102*a* and 102*b*, respectively (e.g., using a formalization as shown for $Env_{cellx}$ described above).

At operation 307, composing agent 509 of first node 101 signals a request to knowledge base 703 at node 103 to fetch matching criteria related to the use case. The request includes the use case identifier.

Responsive to the request to knowledge base 703, at operation 309, knowledge base 703 signals matching criteria related to the use case to first node 101.

At operation 311, composing agent 509 of first node 101 determines whether there is a good fit based on the matching criteria, the local environment description of a cell at distributed node 102*a*, and the local environment description of cell at distributed node 102*b* (e.g., as described with reference to FIG. 2).

At operation 313, composing agent 509 of first node 101 found a good fit for the use case at distributed node 102*a*. First node 101 signals a request to distributed node 102*a* to fetch the machine learning model of 102*a* corresponding to the uses case identifier; and, responsive to the request, distributed node 102*a* signals the machine learning model corresponding to the use case identifier towards first node 101.

At operation 317, first node 101 signals toward second node 104 the machine learning model and a confidence indicator. The confidence indicator indicates a level of confidence of the similarity or fit of the local environment of the cell at distributed node 102*a* to the local environment description of a cell provided by second node 104 (e.g., 90% confidence).

Alternatively, responsive to operation 311, at operation 315 when composing agent 509 of first node 101 did not find a good fit for the use case at either distributed node 102*a* or distributed node 102*b*, first node 101 signals to second node 104 that no machine learning model was found.

Figure 4:
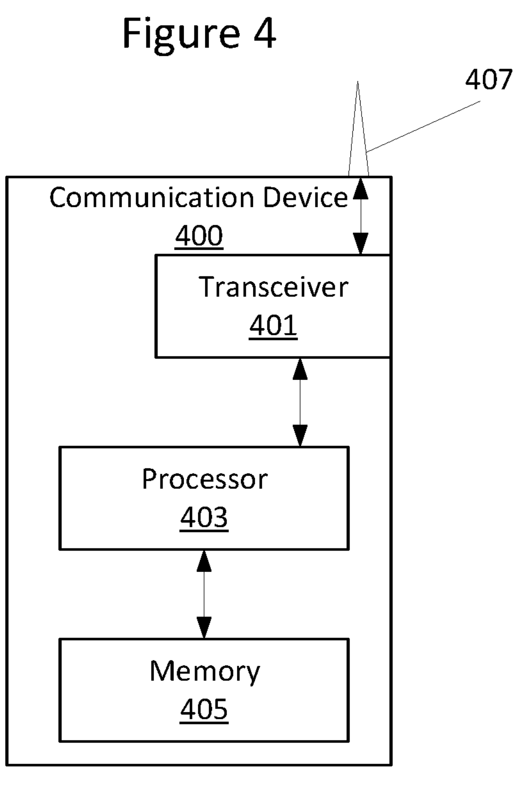
FIG. 4 is a block diagram illustrating an example of a communication device in accordance with some embodiments.

FIG. 4 is a block diagram illustrating elements of a communication device (e.g., a UE) 400 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of the present disclosure.

As shown, communication device 400 may include an antenna 407, and transceiver circuitry 401 including a transmitter and a receiver configured to provide uplink and downlink radio communications with a base station(s) (e.g., corresponding to distributed node 102*a* of FIG. 1) of a distributed network. Communication device 400 may also include processing circuitry 403 (also referred to as a processor) coupled to the transceiver circuitry, and memory circuitry 405 coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that separate memory circuitry is not required. Communication device 400 may also include an interface (such as a user interface) coupled with processing circuitry 403, and/or communication device 400 may be incorporated in a vehicle.

As discussed herein, operations of a communication device may be performed by processing circuitry 403 and/or transceiver circuitry 401. For example, processing circuitry 403 may control transceiver circuitry 401 to transmit communications through transceiver circuitry 401 over a radio interface to a distributed node and/or to receive communications through transceiver circuitry 401 from a distributed node over a radio interface. Moreover, modules may be stored in memory circuitry 405, and these modules may provide instructions so that when instructions of a module are executed by processing circuitry 403, processing circuitry 403 performs respective operations.

Figure 5:
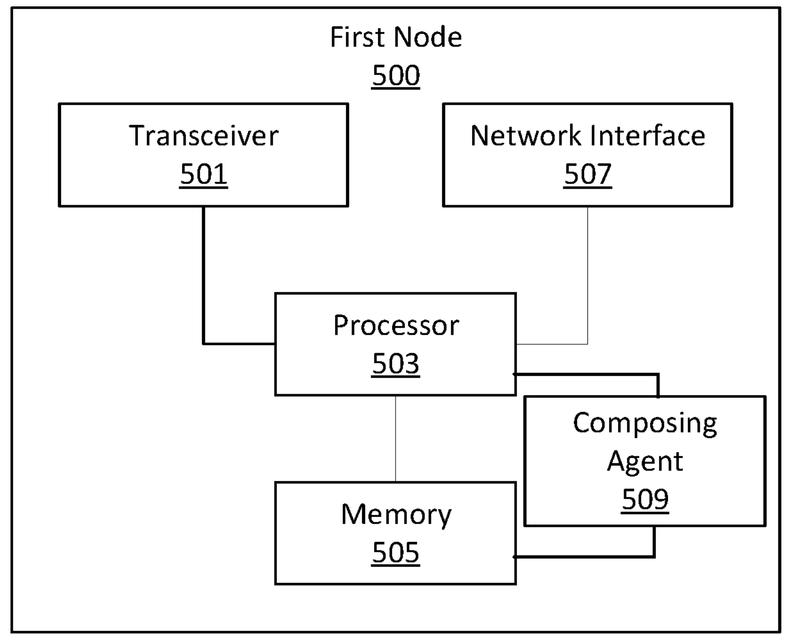
FIG. 5 is a block diagram illustrating an example of a first node in accordance with some embodiments.

FIG. 5 is a block diagram illustrating elements of a first node 500 (also referred to as a network node, base station, eNodeB/eNB, gNodeB/gNB, etc.) of a distributed network configured to provide communication and operations according to embodiments of the present disclosures. As shown, the first node may include transceiver circuitry 501 including a transmitter and a receiver configured to provide uplink and downlink radio communications with communication devices or nodes of a distributed network. The first node may include network interface circuitry 507 configured to provide communications with other nodes (e.g., with other nodes) of the distributed network. The first node may also include processing circuitry 503 (also referred to as a processor) coupled to the transceiver circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required. The first node may also include composing agent 509 coupled to processor, transceiver 501, and/or network interface 507, and configured to perform operations according to embodiments disclosed herein.

As discussed herein, operations of the first node may be performed by processing circuitry 503, network interface 507, transceiver 501, and/or composing agent 509. For example, processing circuitry 503 may control transceiver 501 to transmit downlink communications through transceiver 501 over a radio interface to one or more communication devices and/or to receive uplink communications through transceiver 501 from one or more communication devices over a radio interface. Similarly, processing circuitry 503 may control network interface 507 to transmit communications through network interface 507 to one or more other network nodes and/or to receive communications through network interface from one or more other network nodes. Moreover, modules may be stored in memory 505 and/or composing agent 509, and these modules may provide instructions so that when instructions of a module are executed by processing circuitry 503, processing circuitry 503 performs respective operations (e.g., operations discussed below with respect to Example Embodiments relating to first nodes).

According to some other embodiments, a first node may be implemented as a core network node without a transceiver. In such embodiments, transmission to a communication device may be initiated by the first node so that transmission to the wireless communication device is provided through a network node including a transceiver (e.g., through a base station or radio access node (RAN) node). According to embodiments where the first node is a RAN node including a transceiver, initiating transmission may include transmitting through the transceiver.

Figure 6:
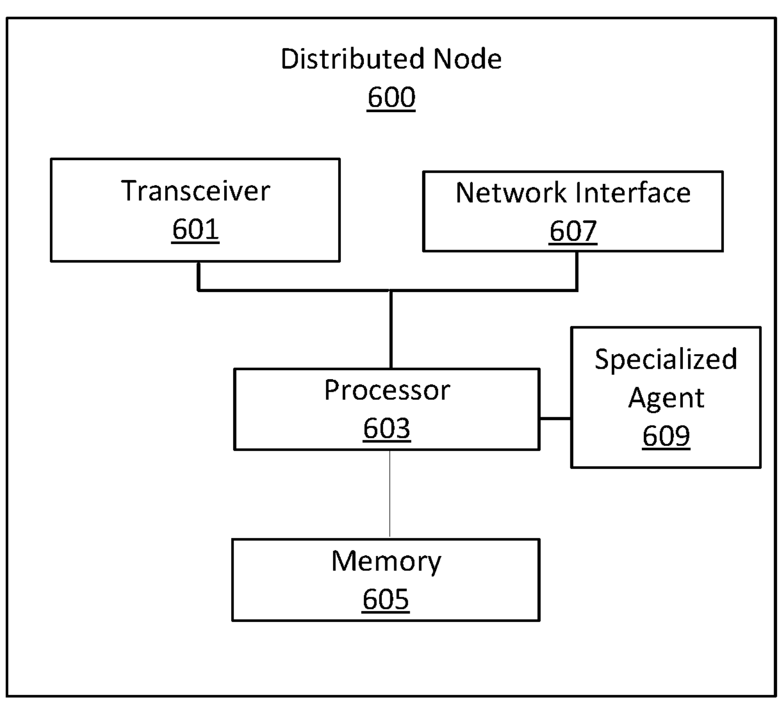
FIG. 6 is a block diagram illustrating an example of a distributed node in accordance with some embodiments.

FIG. 6 is a block diagram illustrating elements of a distributed node 600 (also referred to as a network node, base station, eNodeB/eNB, gNodeB/gNB, router, etc.) of a distributed network configured to provide communication and operations according to embodiments of the present disclosures. As shown, the distributed node may include transceiver circuitry 601 including a transmitter and a receiver configured to provide uplink and downlink radio communications with communication devices or nodes of a distributed network. The distributed node may include network interface circuitry 607 configured to provide communications with other nodes (e.g., with other nodes) of the distributed network. The distributed node may also include processing circuitry 603 (also referred to as a processor) coupled to the transceiver circuitry, and memory circuitry 605 (also referred to as memory) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required. The distributed node may also include specialized agent 609 coupled to processor, transceiver 601, and/or network interface 607, and configured to perform operations according to embodiments disclosed herein.

As discussed herein, operations of the distributed node may be performed by processing circuitry 603, network interface 607, transceiver 601, and/or specialized agent 609. For example, processing circuitry 603 may control transceiver 601 to transmit downlink communications through transceiver 601 over a radio interface to one or more communication devices and/or to receive uplink communications through transceiver 601 from one or more communication devices over a radio interface. Similarly, processing circuitry 603 may control network interface 607 to transmit communications through network interface 607 to one or more other network nodes and/or to receive communications through network interface from one or more other network nodes. Moreover, modules may be stored in memory 605 and/or specialized agent 609, and these modules may provide instructions so that when instructions of a module are executed by processing circuitry 603, processing circuitry 603 performs respective operations (e.g., operations discussed below with respect to Example Embodiments relating to distributed nodes).

According to some other embodiments, a distributed node may be implemented as a core network node without a transceiver. In such embodiments, transmission to a communication device may be initiated by the distributed node so that transmission to the wireless communication device is provided through a network node including a transceiver (e.g., through a base station or radio access node (RAN) node). According to embodiments where the distributed node is a RAN node including a transceiver, initiating transmission may include transmitting through the transceiver.

Figure 7:
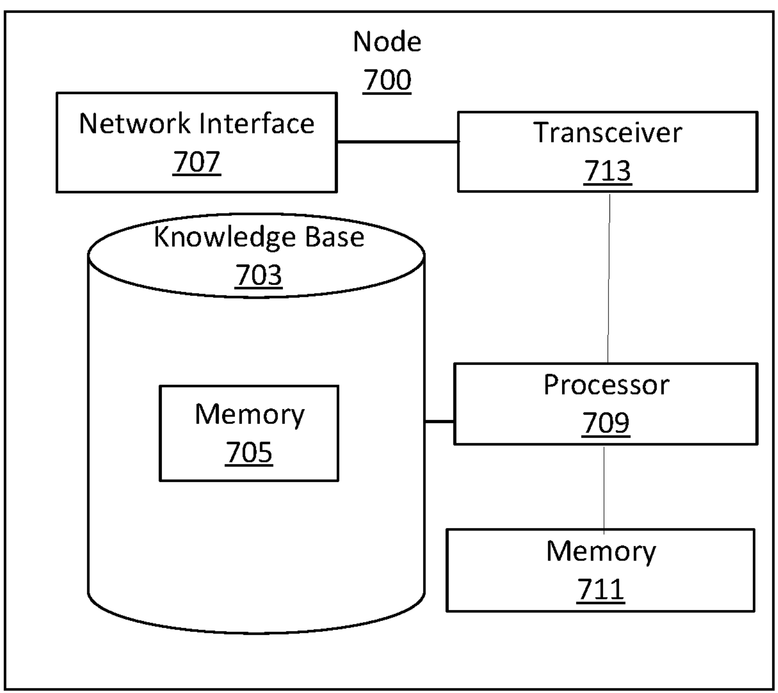
FIG. 7 is a block diagram illustrating an example of node including a knowledge base in accordance with some embodiments.

FIG. 7 is a block diagram illustrating elements of a node 700 (also referred to as a network node, base station, eNodeB/eNB, gNodeB/gNB, router, etc.) of a distributed network configured to provide communication and operations according to embodiments of the present disclosures. As shown, the node may include transceiver circuitry 713 including a transmitter and a receiver configured to provide uplink and downlink radio communications with communication devices or nodes of a distributed network. The node may include network interface circuitry 707 configured to provide communications with other nodes (e.g., with other nodes) of the distributed network. The distributed node may also include processing circuitry 709 (also referred to as a processor) coupled to the transceiver circuitry, and knowledge base 703/memory circuitry 705 (also referred to as memory or knowledge base) coupled to the processing circuitry. The memory circuitry 705 may include computer readable program code that when executed by the processing circuitry 709 causes the processing circuitry to perform operations according to embodiments disclosed herein. According to other embodiments, processing circuitry 709 may be defined to include memory so that a separate memory circuitry is not required.

As discussed herein, operations of the node may be performed by processing circuitry 709, network interface 707, transceiver 713, and/or knowledge base 703. For example, processing circuitry 709 may control transceiver 713 to transmit downlink communications through transceiver 713 over a radio interface to one or more communication devices and/or to receive uplink communications through transceiver 713 from one or more communication devices over a radio interface. Similarly, processing circuitry 709 may control network interface 707 to transmit communications through network interface 707 to one or more other network nodes and/or to receive communications through network interface from one or more other network nodes. Moreover, modules may be stored in memory 705 and/or knowledge base 703, and these modules may provide instructions so that when instructions of a module are executed by processing circuitry 709, processing circuitry 709 performs respective operations (e.g., operations discussed below with respect to Example Embodiments relating to nodes).

According to some other embodiments, a node may be implemented as a core network node without a transceiver. In such embodiments, transmission to a communication device may be initiated by the node so that transmission to the wireless communication device is provided through a network node including a transceiver (e.g., through a base station or radio access node (RAN) node). According to embodiments where the node is a RAN node including a transceiver, initiating transmission may include transmitting through the transceiver.

Figure 8:
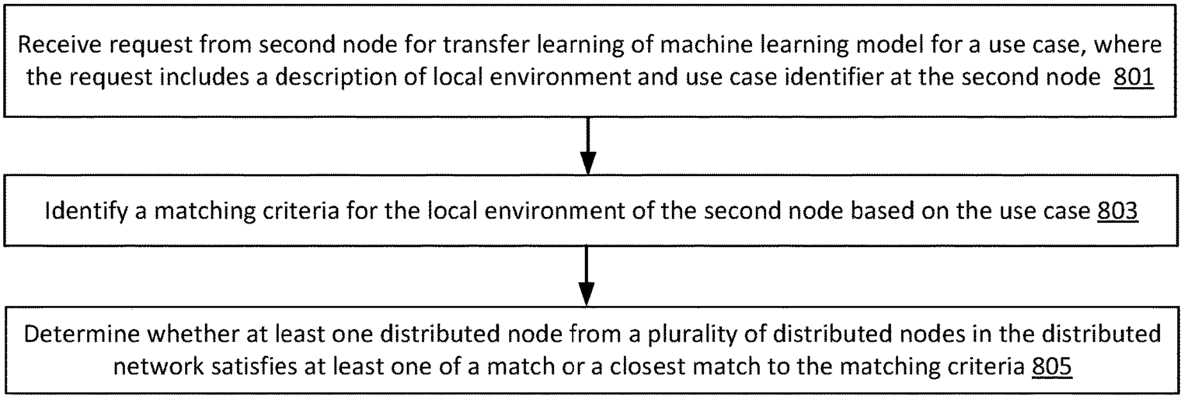
FIG. 8 is a flow chart illustrating examples of processes performed by a first node in accordance with some embodiments.

Operations of a first node will now be discussed with reference to the flow charts of FIGS. 8 and 9 according to some embodiments of the present disclosure. FIGS. 8 and 9 will be described below as being performed by first node 101 (implemented using the structure of the block diagram of FIG. 5). For example, modules may be stored in memory 505 or composing agent 509 of FIG. 5, and these modules may provide instructions so that when the instructions of a module are executed by respective circuitry 903, processing circuitry 503 performs respective operations of the flow chart.

FIG. 8 is a flow chart illustrating an example of a process performed by a first node (e.g., first node 101) operating in a distributed network.

At block 801, processing circuitry 503 receives a request from a second node for transfer learning of a machine learning model for a use case. The request includes a description of a local environment and a use case identifier at the second node.

At block 803, processing circuitry 503 identifies a matching criteria for the local environment of the second node based on the use case.

At block 805, processing circuitry 503 determines whether at least one distributed node from a plurality of distributed nodes in the distributed network satisfies at least one of a match or a closest match to the matching criteria.

FIG. 9 is a flow chart illustrating an example of further operations performed by a first node (e.g., first node 101) operating in a distributed network.

In some embodiments, at block 901, processing circuitry 503 clusters the plurality of distributed nodes in the distributed network based on a first criteria of the matching criteria. The clustering includes identifying the plurality of distributed nodes in the distributed network that satisfy a match to the first criteria of the matching criteria. The match includes a match between at least a one value for the local environment of the second node that matches the at least one value for the local environment of each distributed node in the plurality of nodes.

In some embodiments, the local environment of the second node includes a first set of parameters as a first set of features that describe the local environment of the second node.

In some embodiments, the local environment of each of the distributed nodes in the plurality of distributed nodes includes a second set of parameters as a second set of features that describe the local environment at each of the distributed nodes in the plurality of distributed nodes.

In some embodiments, the use case includes a relation to a subset of the first set of features that describe the local environment at the second node.

At block 903, processing circuitry 503 fetches the matching criteria from a knowledge base.

In some embodiments, the first criteria of the matching criteria includes a rule based on the match between at least one parameter from the first set of parameters for the local environment of the second node and the at least one parameter in the second set parameters for the local environment of each distributed node in the plurality of nodes.

In some embodiments, the matching criteria includes a second criteria including a rule based on at least one parameter from the first set of parameters for the local environment of the second node that approximates the at least one parameter in the second set of parameters for the local environment of each distributed node in the plurality of distributed nodes.

In some embodiments, the approximates includes a similarity based on the closest match to the at least one parameter.

At block 905, processing circuitry 503 signals a request to each of the distributed nodes in the plurality of distributed nodes. The request includes a request for the local environment at a distributed node from the plurality of distributed nodes.

At block 907, responsive to the request, processing circuitry 503 receives a response from each distributed node of the plurality of distributed nodes. The response includes the local environment at the distributed node.

In some embodiments, the use case identifier is a network slice instance, NSI, identifier.

At block 909, processing circuitry 503 signals a request to a distributed node from the plurality of distributed nodes for the machine learning model. The request further includes the use case identifier.

At block 911, processing circuitry 503 fetches the machine learning model of the distributed node when the at least one of the match or the closest match to the matching criteria to the local environment of the distributed node from the plurality of distributed nodes.

At block 913, processing circuitry 503 signals the machine learning model to the second node.

Alternatively, at block 915, processing circuitry 503 signals a message to the second node when the matching criteria for the local environment of the second node does not satisfy at least one of the match or the closest to the local environment of a distributed node of the plurality of distributed nodes. The message includes a description that no machine learning model was found.

The various operations of FIG. 9 may be optional with respect to some embodiments of first nodes and related methods. Regarding method of the example embodiment of the flow chart of FIG. 8, for example, the operations of FIG. 9 may be optional.

Figures 10, 11:
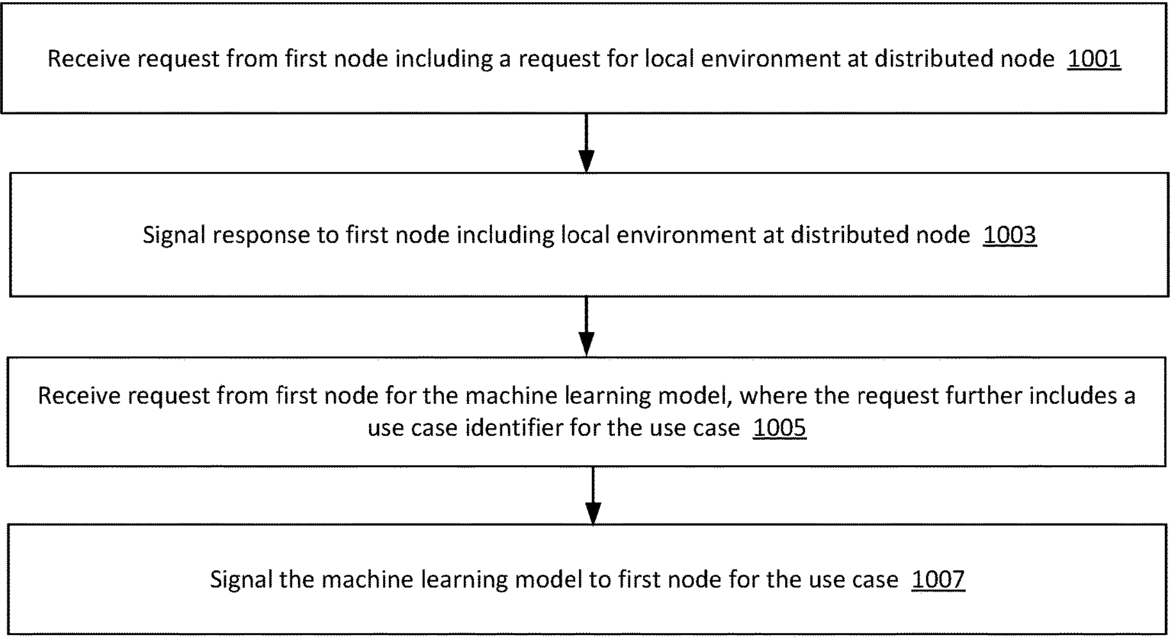
FIG. 10 is a flow chart illustrating examples of processes performed by a distributed node in accordance with some embodiments.
FIG. 11 is a flow chart illustrating examples of processes performed by a node including a knowledge base in accordance with some embodiments.

Operations of a distributed node will now be discussed with reference to the flow chart of FIG. 10 according to some embodiments of the present disclosure. FIG. 10 will be described below as being performed by distributed node 102 (implemented using the structure of the block diagram of FIG. 6). For example, modules may be stored in memory 605 or specialized agent 609 of FIG. 6, and these modules may provide instructions so that when the instructions of a module are executed by respective circuitry 603, processing circuitry 603 performs respective operations of the flow chart.

FIG. 10 is a flow chart illustrating an example of a process performed by a distributed node (e.g., distributed node 102) in a distributed network for transfer learning of a machine learning model for a use case.

At block 1001, processing circuitry 603 receives a request from a first node in the distributed network. The request includes a request for the local environment at the distributed node.

At block 1003, responsive to the request, processing circuitry 603 signals a response to the first node including the local environment at the distributed node.

In some embodiments, the local environment at the distributed node includes a second set of parameters as a second set of features that describe the local environment at the distributed node.

In some embodiments, the use case includes a relation to a subset of a first set of features that describe the environment at the second node.

At block 1005, processing circuitry 603 receives a request from the first node for the machine learning model. The request further includes a use case identifier for the use case.

At block 1007, responsive to the request, processing circuitry 603 signals the machine learning model to the first node for the use case.

In some embodiments, the use case identifier is a network slice instance, NSI, identifier.

Various operations of FIG. 10 may be optional with respect to some embodiments of distributed nodes and related methods. For example, operations of blocks 1005-1007 of FIG. 10 may be optional.

Operations of a node will now be discussed with reference to the flow chart of FIG. 11 according to some embodiments of the present disclosure. FIG. 11 will be described below as being performed by node 103 (implemented using the structure of the block diagram of FIG. 7). For example, modules may be stored in memory 705 or knowledge base 703 of FIG. 7, and these modules may provide instructions so that when the instructions of a module are executed by respective circuitry 709, processing circuitry 709 performs respective operations of the flow chart.

FIG. 11 is a flow chart illustrating an example of a process performed by a node (e.g., node 103) in a distributed network for transfer learning of a machine learning model for a use case.

At block 1101, processing circuitry 709 receives a request for matching criteria for the use case from a first node in the distributed network.

At block 1103, processing circuitry 709 signals the matching criteria for the use case to the first node.

In some embodiments, the use case includes a relation to a subset of a first set of features that describe a local environment at a second node.

In some embodiments, the local environment includes a first set of parameters as the first set of features that describe the local environment at the second node.

In some embodiments, the matching criteria includes a first criteria including a rule based on a match between at least one parameter from the first set of parameters for the local environment of the second node and the at least one parameter in a second set parameters for a local environment of each distributed node in the plurality of nodes.

In some embodiments, the local environment of each of the distributed nodes in the plurality of distributed nodes includes the second set of parameters as a second set of features that describe the local environment at each of the distributed nodes in the plurality of distributed nodes.

In some embodiments, the matching criteria includes a second criteria including a rule based on at least one parameter from the first set of parameters for the local environment of the second node that approximates the at least one parameter in the second set of parameters for the local environment of each distributed node in the plurality of distributed nodes. In some embodiments, the approximates includes a similarity based on a closest match to the at least one parameter.

Various operations of FIGS. 8-11 may be optional with respect to some embodiments of network nodes and related methods.

Various embodiments of the present disclosure include a transfer learning method that may produce more accurate local machine learning models compared some approaches of federated learning and may avoid training from scratch. As a consequence, there may be a performance improvement.

Explanations for abbreviations from the above disclosure are provided below.

| Abbreviation | Explanation |
|---|---|
| DNS | Domain Name System |
| UE | User Equipment |
| RAT | Radio Access Technology |
| IMEI | International Mobile Equipment Identity |
| 3GPP | $3^{rd}$ Generation Partnership Project |
| 5G | $5^{th}$ Generation Wireless Systems |
| NG | Next Generation |
| UL | Uplink |
| DL | Downlink |
| CNN | Convolutional Neural Network |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A computer-implemented method performed by a first node in a distributed network for transfer learning of a machine learning model for a use case, the method comprising:

receiving a request from a second node for transfer learning of a machine learning model for a use case, wherein the request comprises a description of a local environment and a use case identifier at the second node and the local environment of the second node comprises a first set of parameters as a first set of features that describe the local environment of the second node;

identifying a matching criteria for the local environment of the second node based on the use case;

determining whether at least one distributed node from a plurality of distributed nodes in the distributed network satisfies at least one of a match or a closest match to the matching criteria; and responsive to determining that the at least one distributed node satisfies the match or the closest match, receiving a source machine learning model corresponding to the use case identifier from the at least one distributed node; and signaling the source machine learning model to the second node, causing the second node to initialize a machine learning model for the use case using parameters of the source machine learning model.

2. The method of claim 1, further comprising:

clustering the plurality of distributed nodes in the distributed network based on a first criteria of the matching criteria, wherein the clustering comprises identifying the plurality of distributed nodes in the distributed network that satisfy the match to the first criteria of the matching criteria.

3. The method of claim 1, wherein the local environment of each of the distributed nodes in the plurality of distributed nodes comprises a second set of parameters as a second set of features that describe the local environment at each of the distributed nodes in the plurality of distributed nodes.

4. The method of claim 1, wherein the use case comprises a relation to a subset of the first set of features that describe the local environment at the second node.

5. The method of claim 1, further comprising:

fetching the matching criteria from a knowledge base.

6. The method of claim 1, wherein the first criteria of the matching criteria comprises a rule based on the match between at least one parameter from the first set of parameters for the local environment of the second node and the at least one parameter in the second set of parameters for the local environment of each distributed node in the plurality of nodes.

7. The method of claim 1, wherein the matching criteria comprises a second criteria comprising a rule based on at least one parameter from the first set of parameters for the local environment of the second node that approximates the at least one parameter in the second set of parameters for the local environment of each distributed node in the plurality of distributed nodes.

8. The method of claim 7, wherein the approximates comprises a similarity based on the closest match to the at least one parameter.

9. The method of claim 1, further comprising:

signaling a request to each of the distributed nodes in the plurality of distributed nodes, wherein the request comprises a request for the local environment at a distributed node from the plurality of distributed nodes; and responsive to the request, receiving a response from each distributed node of the plurality of distributed nodes, wherein the response comprises the local environment at the distributed node.

10. The method of claim 1, wherein the use case identifier is a network slice instance, NSI, identifier.

11. The method of claim 1, further comprising:

signaling a message to the second node when the matching criteria for the local environment of the second node does not satisfy at least one of the match or the closest match to the matching criteria to the local environment of a distributed node of the plurality of distributed nodes, wherein the message comprises a description that no machine learning model was found.

12. A first node configured to operate in a distributed network, the first node comprising:

processing circuitry; and memory coupled with the processing circuitry, wherein the memory includes instructions that when executed by the processing circuitry causes the first node to perform operations comprising:

receive a request from a second node for transfer learning of a machine learning model for a use case, wherein the request comprises a description of a local environment and a use case identifier at the second node and the local environment of the second node comprises a first set of parameters as a first set of features that describe the local environment of the second node;

identify a matching criteria for the local environment of the second node based on the use case;

determine whether at least one distributed node from a plurality of distributed nodes in the distributed network satisfies at least one of a match or a closest match to the matching criteria; and responsive to determining that the at least one distributed node satisfies the match or the closest match, receive a source machine learning model corresponding to the use case identifier from the at least one distributed node; and signal the source machine learning model to the second node, causing the second node to initialize a machine learning model for the use case using parameters of the source machine learning model.

13. The first node of claim 12, the operations further comprising:

cluster the plurality of distributed nodes in the distributed network based on a first criteria of the matching criteria, wherein the clustering comprises identify the plurality of distributed nodes in the distributed network that satisfy the match to the first criteria of the matching criteria.

14. The first node of claim 12, wherein the local environment of each of the distributed nodes in the plurality of distributed nodes comprises a second set of parameters as a second set of features that describe the local environment at each of the distributed nodes in the plurality of distributed nodes.

15. The first node of claim 12, the operations further comprising:

fetch the matching criteria from a knowledge base.

16. The first node of claim 12, wherein the first criteria of the matching criteria comprises a rule based on the match between at least one parameter from the first set of parameters for the local environment of the second node and the at least one parameter in the second set of parameters for the local environment of each distributed node in the plurality of nodes.

17. The first node of claim 12, wherein the matching criteria comprises a second criteria comprising a rule based on at least one parameter from the first set of parameters for the local environment of the second node that approximates the at least one parameter in the second set of parameters for the local environment of each distributed node in the plurality of distributed nodes.

18. The first node of claim 12, the operations further comprising:

signal a request to each of the distributed nodes in the plurality of distributed nodes, wherein the request comprises a request for the local environment at a distributed node from the plurality of distributed nodes; and responsive to the request, receive a response from each distributed node of the plurality of distributed nodes, wherein the response comprises the local environment at the distributed node.

* * * * *